(12) United States Patent
George

(10) Patent No.: US 7,492,718 B2
(45) Date of Patent: Feb. 17, 2009

(54) SERIAL PROTOCOL CONTROLLER THAT SUPPORTS SUBROUTINE CALLS

(75) Inventor: H. Allan George, Norton, MA (US)

(73) Assignee: Wind River Systems, Inc., Alameda, CA (US)

( * ) Notice: Subject to any disclaimer, the term of this patent is extended or adjusted under 35 U.S.C. 154(b) by 875 days.

(21) Appl. No.: 11/055,420

(22) Filed: Feb. 10, 2005

(65) Prior Publication Data

US 2006/0176892 A1 Aug. 10, 2006

(51) Int. Cl.
*H04L 12/56* (2006.01)
(52) U.S. Cl. .................. 370/241; 370/412; 718/108; 714/30
(58) Field of Classification Search .................. None
See application file for complete search history.

(56) References Cited

U.S. PATENT DOCUMENTS 5,274,817 A * 12/1993 Stahl .................. 718/100
6,425,101 B1 * 7/2002 Garreau .................. 714/727
6,567,839 B1 * 5/2003 Borkenhagen et al. ...... 718/103
7,145,913 B2 * 12/2006 Craig et al. .................. 370/401

* cited by examiner

*Primary Examiner*—Wing F Chan
*Assistant Examiner*—Brian Roberts
(74) *Attorney, Agent, or Firm*—Fay Kaplun & Marcin, LLP

(57) ABSTRACT

Described is a protocol controller that supports calls to a packet subroutine which includes a packet processing engine programmed to retrieve packets from a packet memory and to interpret the packets, a working chain pointer module of the packet processing engine programmed to generate a packet memory address for each packet and a return address register of the working chain pointer module, adapted to store a return packet address. Upon processing a call packet, the packet processor engine instructs the working chain pointer module to save a next packet address of a normal packet flow in the return address register, and instructs the working chain pointer module to generate the packet address to execute the packet routine.

20 Claims, 3 Drawing Sheets

SERIAL PROTOCOL CONTROLLER THAT SUPPORTS SUBROUTINE CALLS

BACKGROUND INFORMATION

Software and hardware devices are routinely used as protocol controllers, to manage the flow of data packets moving between various components of one or more electronic processors. Protocol controllers normally transmit the packets arranged in fixed groups of buffers that are linked together via linked lists. The linked lists describe how the groups of buffers relate to each other. The host processor in these systems typically carries out all the computational tasks required to modify the stream of packets being sent, for example to direct the execution to a different flow of packets. This extracts a large computational penalty on the host CPU, and may slow down the performance of the system.

The protocol controllers described above are often used while testing devices, such as computer chips, software modules, and hardware systems embedded with software instructions, among others. Testing is carried out extensively during development of these devices, to ensure that the product shipped to the consumers performs as expected, and that no erroneous results are produced under a variety of different operating conditions. When the host CPU of a system is used to carry out the functions described above, the entire process slows down, particularly when the stream of packets is modified to insert into the stream an alternate group of packets. During the debugging and development of a complex system these operations are carried out a large number of times, and the additional load on the host CPU can significantly increase the time required for the development.

A common standard used to debug and test computational systems is the Joint Test Action Group (JTAG) standard, also known as the IEEE Standard 1149.1. This standard specifies how to control and monitor the electronic components of compliant devices on a printed integrated circuit (IC) board. The JTAG protocol contains the controls necessary to read and to set the values of the internal registers of the devices being tested in a process known as boundary scanning. The testing of IC boards is simplified by using the JTAG protocol, since signals and data which are not normally available at the connectors of the IC board can be read and set using the JTAG access port. The protocol also allows testing of equipment connected to the port, to identify the components found on the board, and to control and monitor the device's output.

SUMMARY OF THE INVENTION

In one exemplary aspect, the present invention is directed to a protocol controller that supports calls to a packet subroutine which includes a packet processing engine programmed to retrieve packets from a packet memory and to interpret the packets, a working chain pointer module of the packet processing engine programmed to generate a packet memory address for each packet and a return address register of the working chain pointer module, adapted to store a return packet address. Upon processing a call packet, the packet processor engine instructs the working chain pointer module to save a next packet address of a normal packet flow in the return address register, and instructs the working chain pointer module to generate the packet address to execute the packet routine.

In another aspect, the present invention is directed to a system for reusing packet routines comprising a serial protocol controller connectable to a target processor using a JTAG protocol a packet processing engine programmed to retrieve packets from a packet memory and to interpret the packets, a working chain pointer module of the packet processing engine programmed to generate a next packet memory address and a return address register of the working chain pointer module, adapted to store a return packet address, wherein, upon processing a call packet, the packet processor engine instructs the working chain pointer module to generate the next packet memory address pointing to the packet routine, and wherein upon processing a return packet, the packet processor engine signals the working chain pointer module to generate the return packet address to resume a normal packet flow.

In yet another aspect, the present invention is directed to a method of loading a packet routine during a normal packet flow, comprising placing a call packet in the normal packet flow, placing a return packet concluding the packet routine, in a packet processor engine, executing a next packet associated with the packet routine upon processing the call packet, storing a packet address immediately following a current packet address of the normal packet flow before executing the packet routine and in the packet processor engine, executing a next packet returning to the normal packet flow upon processing the return packet.

In addition, an electronic processor having a protocol controller that supports calls to a packet routine, the protocol controller being adapted to execute stored instructions that include instructions to process a next packet from a packet memory associated with the packet routine upon receiving a call packet embedded in a normal flow of packets, storing a packet address immediately following a current packet address of the normal flow of packets before executing the packet routine and processing a next packet returning to the normal flow of packets upon receiving a return packet terminating the packet routine.

DETAILED DESCRIPTION

Figure 1:
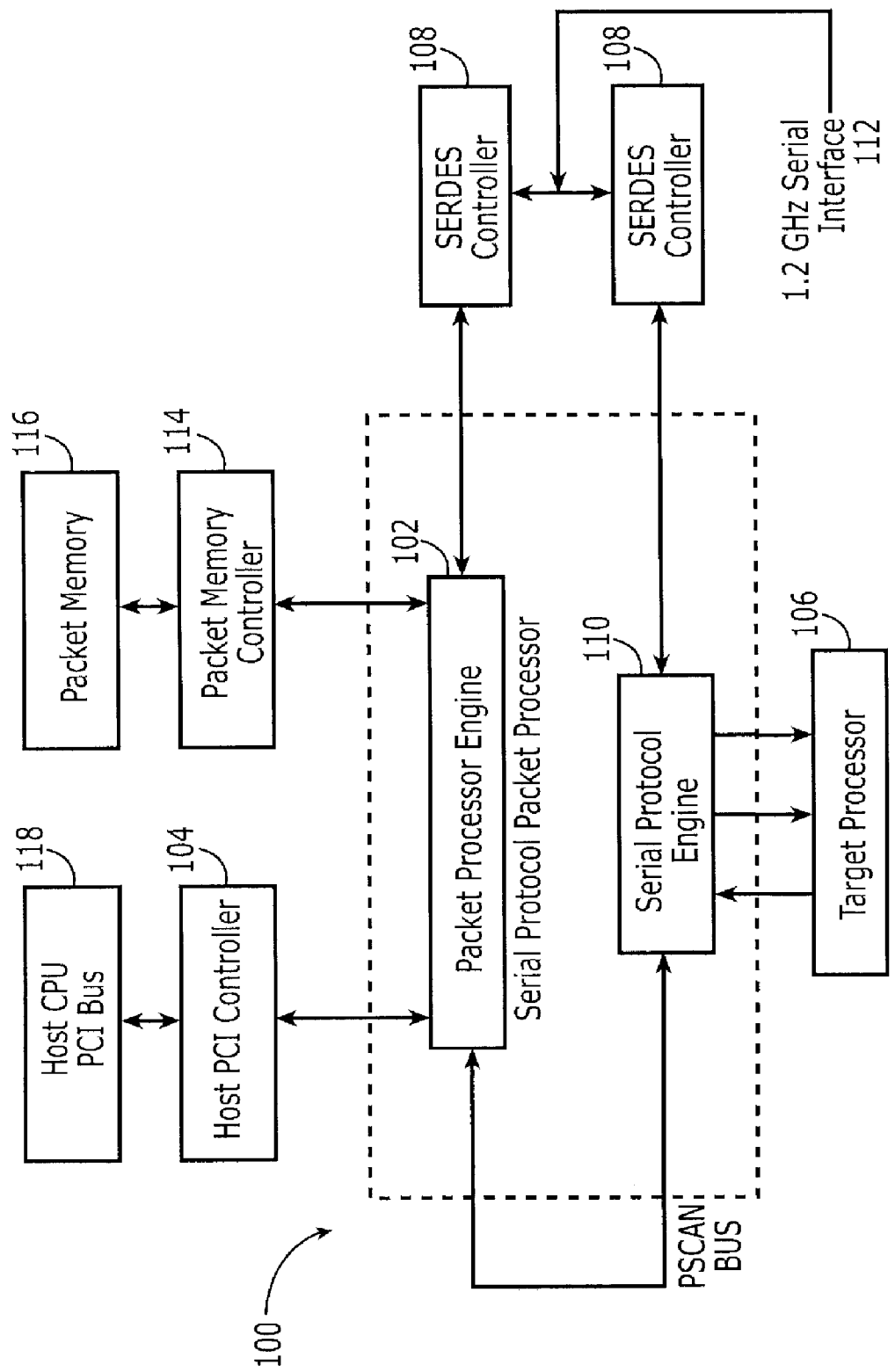
FIG. 1 is a diagram showing a representation of an exemplary serial protocol controller according to the invention.

The present invention may be further understood with reference to the following description of preferred exemplary embodiments and the related appended drawings, wherein like elements are provided with the same reference numerals. The present invention is related to methods and systems used to access the internal data and programming of computational devices, such as embedded devices or other specialized computers running complex software. More specifically, the present invention is related to systems to view and modify the internal data and programming of a device through a JTAG access port, for example during testing and debugging of the device.

Protocol controllers normally transmit packets of data that are arranged within fixed groups of buffers. The buffers are linked together via linked lists, which describe the relationship between the various buffers. The data may be transmitted between components of an electronic device, or between separate devices. Conventional controllers do not have the capability to modify the stream of packets that is being sent. As a result, the CPU of the host device is left to respond to any condition which requires a rearrangement of the streams of packets. The host CPU thus uses its computing resources to make all the decisions regarding the execution of the packets, and to control which packet stream is to be sent. For example, conventional controllers cannot interject a particular buffer within an existing stream of packets. In general, the only way to transmit a particular buffer at various points in the normal stream is to repeat the buffer in the linked list.

According to the exemplary embodiments of the present invention, a Serial Protocol Controller (SPC) is provided, that has the capability to support subroutine calls to a packet routine, thus providing the capability to efficiently re-use packet procedures at multiple points in the execution of a stream of packets. The SPC controller is able to switch to the packet subroutine and return to the normal flow without requiring the intervention of the host CPU. This implementation results in reducing the computational overhead of the host CPU, so that more resources can be directed by the host towards performing its normal functions, instead of modifying the packet streams. Since the same set of packets may be used multiple times, similar to a conventional software subroutine, the size of the code necessary to give a functionality to the device is reduced. The programming and debugging of the device also is simplified. The time necessary to test the device is thus reduced, since calls to a packet subroutine can be made a large number of times while the software executes on the device.

The SPC according to the present invention may be used effectively to improve the efficiency of software tools used to develop, test and debug the programming of electronic devices. The average device can contain millions of lines of code to program it to perform its functions. As applications for the devices become more complex, and the device's CPU's become faster, developers have a need to access the core processor and its peripherals. This enables the developers to determine how well the CPU and its peripherals communicate, and how well the code is being executed by the CPU. Development and testing software tools assist in these tasks. For example, the Probe and the Ice tools developed by Wind River Systems are part of a development suite that gives to the developer insight into the processes taking place within a device and its CPU.

Using these and similar tools, the developer can perform debugging tasks such as monitoring and modifying memory, manipulating large numbers of register configurations, and performing multiple steps of editing, compiling, downloading and debugging complex applications for the device. For example, JTAG ports can be used to access the JTAG scan chain for the device, to debug the code on one or more CPU's, whether they are individual components or whether they are on a chip within an embedded device. The speed at which the data can be viewed and modified by the system directly affects how rapidly a given code can be debugged and made to work as desired on a device. It is thus important to optimize the exchange of data packets between the affected devices. It is also important to efficiently reuse packet routines that can carry out specific functions, so that it is not necessary to rewrite the same set of packet routines multiple times, or refer to those packets in the linked list each time that the functionality provided by those packets is required.

More specifically, the exemplary SPC described in the following embodiment of the invention is capable of supporting subroutine calls. The SPC can embed a packet routine anywhere in the packet flow, whenever a special packet passes through the SPC. For example, the SPC may be programmed to suspend the execution of a stream of packets when a CALL PACKET is received. The CALL PACKET may be, for example, a header only packet that specifies the address of the packet routine to be executed. When the SPC encounters the CALL PACKET, it interrupts the normal packet flow, and jumps to the packet routine specified in the CALL PACKET. The exemplary SPC also stores the address of the next packet that would have been executed in the normal packet flow. The stored address enables the SPC to resume the normal flow of packets once the packet routine has been completed.

According to the exemplary embodiment, the end of the packet routine is identified by a RETURN PACKET, which also is a header only packet. The RETURN PACKET may be placed at the end of the series of packets forming the packet routine, so that it is reached by the SPC after the instructions specified by the packet routine have been carried out. When the RETURN PACKET is reached by the SPC, the address of the next packet, following the last packet executed before the packet routine call, is retrieved from storage. The execution of the normal packet flow thus can be resumed by the SPC at the appropriate location, once the instructions specified by the packet routine have been completed.

The support for subroutine calls by the Serial Protocol Controller according to the invention, provides an efficient mechanism to reuse common packet procedures whenever they are useful, without adding extra code or modifying the linked list of the device. The feature provided is similar to the subroutine calls used routinely when programming a general purpose electronic computer. In one exemplary embodiment of the invention, the SPC is programmed to prevent nesting of the packet routines. This is to simplify the storing of the next packet address, to resume execution after the packet routine is completed, and to simplify the addressing of the packets. Accordingly, only one packet routine at a time may be called using a CALL PACKET in this embodiment. Those of skill in the art will understand that this is not a limitation of the present invention because CALL routines may be nested and the return addresses may be stored in a LIFO (last in first out) storage array so that return addresses will be retrieved in the opposite order from which they were stored. The described embodiment did not use the LIFO implementation. However, the LIFO implementation may be used with the present invention.

FIG. 1 shows a block diagram of an exemplary embodiment of the SPC according to the invention. The SPC 100 is adapted to support subroutine calls implemented with packet streams, so that a selected buffer of packets can be reused by the software in a simple and efficient manner. These features enable a software debugging and development system to be carried out more efficiently, for example in the context of testing under the JTAG protocol. The SPC 100 comprises several different components. A Serial Protocol Engine 110 and a Packet Processor Engine 102 are part of the SPC 100. Various connections are also provided, such as a connection with the target processor 106, and with a serial interface 112 via one or more serializer/de-serializer (SERDES) controllers 108. A host PCI controller 104 connected to a host CPU 118 and a packet memory controller 114, connected to a packet memory 116 are also connected operatively to the SPC 100.

The Packet Processor Engine (PPE) 102 is responsible for interpreting the packets from the packet memory 116, received via the packet memory controller 114. The PPE 102 controls the packet flow through the SPC 100, and makes the switching decisions between which packet routines are processed. For example, the PPE 102 may be programmed to redirect the processing from the current packet flow to a packet routine, and then back to the current packet flow once the routine has been completed. Thus the packet routine calls and returns are controlled by the PPE 102 according to the present embodiment of the invention.

Figure 2:
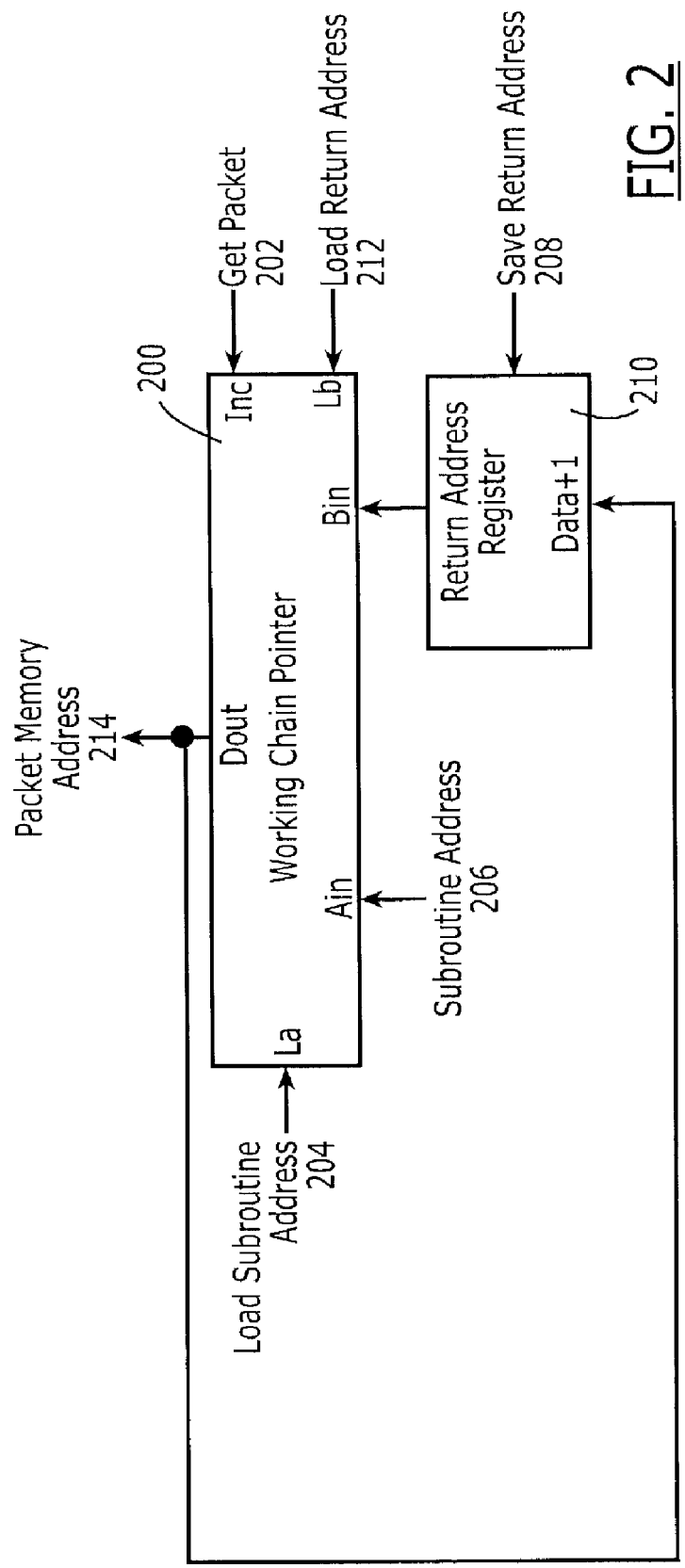
FIG. 2 is a diagram showing a representation of an exemplary working chain pointer module according to the invention.

Within the PPE 102 is found a Working Chain Pointer (WCP) module, adapted to generate a packet memory address indicating the packets to be retrieved from the packet memory 116. These packets are the ones that are executed next by the PPE 102. FIG. 2 shows a diagram representing the exemplary WCP 200 of the PPE 102. During normal execution of a buffer containing packets, the WCP 200 sequentially provides the addresses of the packets to be retrieved from packet memory 116 and to be executed by the SPC 100. For example, the packet address may be incremented by one to the next location in the packet memory 116 every time that a "get packet" signal 202 is activated.

When a subroutine is called, the normal packet flow is interrupted. In that case, the PPE 102 activates a "load subroutine address" signal 204 that is received by the WCP 200. When that signal is received, the PPE 102 retrieves the value of the "subroutine address" 206 from the CALL PACKET, as described above, and loads the "subroutine address" 206 into the WCP 200. This causes the packet flow to jump from the normal packet flow to the location of the packet routine. At the same time, a "save return address" signal 208 is activated, which causes the WCP 200 to store in a register the address of the next packet of the normal packet flow, e.g. the value of the current packet address+1 in the normal packet flow may be saved in a return address register 210. The execution of the packets found in the packet routine then can proceed.

A RETURN PACKET may be placed at the end of the packet routine, to indicate that the routine has been completed. The subroutine packet flow continues until the RETURN PACKET is executed by the SPC 100. When the RETURN PACKET is executed at the end of the packet routine, the PPE 102 activates a "load return address" signal 212 that causes the WCP 200 to retrieve from the return address register 210 the previously saved packet return address. As described above, this is the address of the next packet to be executed in the normal packet flow that was interrupted to run the packet routine. The WCP 200 thus generates a packet memory address 214 which directs the PPE 102 to resume the execution of the normal packet flow where it was left off.

Figure 3:
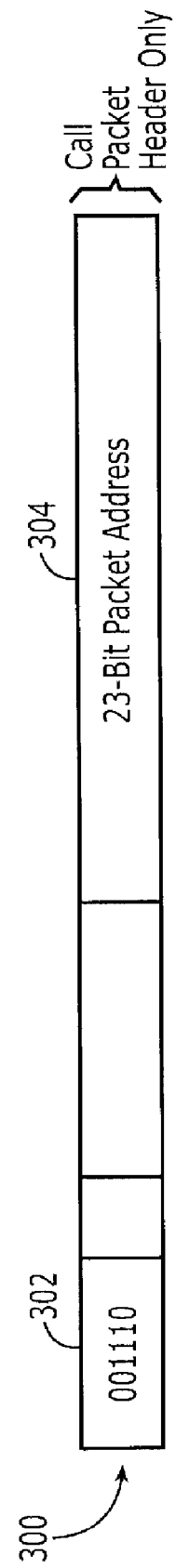
FIG. 3 is a diagram showing a representation of a subroutine call packet according to an embodiment of the invention.

The CALL PACKET used to invoke execution of the packet routine is shown schematically in FIG. 3. The CALL PACKET 300 according to the present embodiment of the invention is a header only packet used to insert a packet subroutine into the normal stream of packets. The CALL PACKET 300 comprises an identifier field 302 that may include, for example, the numerical identifier "001110". When a CALL PACKET 300 is encountered, the PPE 102 saves its current working pointer address+1 (i.e., the next address in the normal flow) in the return address register 210, and loads into the WCP 200 the new address of the buffer routine specified in the 23-bit packet address field 304. As described above, only one packet routine at a time may be invoked since CALL PACKETS cannot be nested in this exemplary embodiment.

Figure 4:
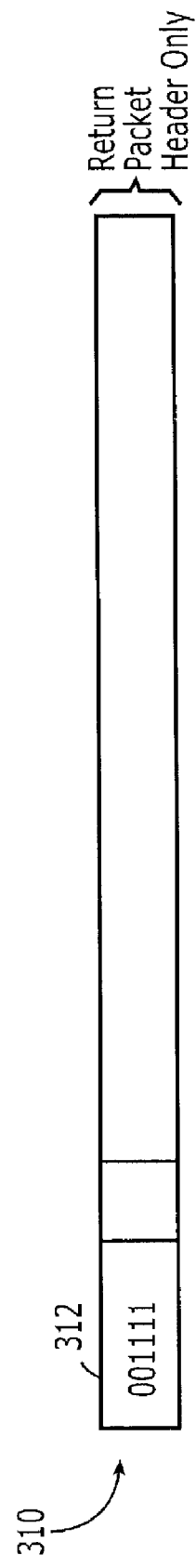
FIG. 4 is a diagram showing a representation of a subroutine return packet according to an embodiment of the invention.

A representation of an exemplary RETURN PACKET is shown schematically in FIG. 4. The RETURN PACKET 310 may be a header packet only, and comprises an identification field 312 which may contain, for example, the numerical identifier "001111". In the exemplary embodiment of the invention, the RETURN PACKET 310 has no data associated with it, and is treated by the PPE 102 as a return command from a subroutine. When the RETURN PACKET 310 is encountered by the PPE 102, the address that was stored in the return address register 210 is loaded into the WCP 200, so that the execution of the normal flow of packets can resume where it left off at the time the packet routine was invoked.

Although the present invention was described with reference to specific exemplary embodiments using a testing system based on the JTAG protocol, the system described above can be applied with minimal changes to other platforms of similar architecture. Accordingly, the above described exemplary embodiments are to be treated as descriptive rather than limiting.

What is claimed is:

1. A protocol controller that supports calls to a packet subroutine, comprising:
 a packet processing engine programmed to retrieve packets from a packet memory and to interpret the packets;
 a working chain pointer module of the packet processing engine programmed to generate a packet memory address for each packet; and
 a return address register of the working chain pointer module, adapted to store a return packet address,
 wherein, upon processing a call packet, the packet processor engine instructs the working chain pointer module to save a next packet address of a normal packet flow in the return address register, and instructs the working chain pointer module to generate the packet address to execute the packet routine.

2. The protocol controller according to claim 1, wherein the packet processor engine, upon processing a return packet, signals the working chain pointer module to retrieve the return packet address from the return address register, and to generate the next packet address to resume the normal packet flow.

3. The protocol controller according to claim 2, wherein the working chain pointer generates a return packet address corresponding to one of the packets immediately following a last processed packet in the normal packet flow.

4. The protocol controller according to claim 2, wherein the return packet comprises a numerical packet identifier.

5. The protocol controller according to claim 1, wherein in response to receiving the call packet, the packet processor engine sends to the working chain pointer module a "load subroutine address signal" containing a subroutine address obtained from the call packet, and a "save return address signal".

6. The protocol controller according to claim 1, wherein in response to receiving a return packet, the packet processor engine sends to the working chain pointer a "load return address" signal.

7. The protocol controller according to claim 1, wherein the working chain pointer module generates the packet memory address based on one of a packet address immediately following the current packet address, a subroutine packet address from the call packet, and a packet address retrieved from the return address register.

8. The protocol controller according to claim 1, wherein the working chain pointer module generates the packet memory address in response to one of a "load subroutine address" signal, "get packet" signal, and "load return address" signal from the packet processor engine.

9. The protocol controller according to claim 1, wherein the call packet comprises a numerical packet identifier and a subroutine packet address.

10. A system for reusing packet routines comprising:
 a serial protocol controller connectable to a target processor using a JTAG protocol;

a packet processing engine programmed to retrieve packets from a packet memory and to interpret the packets;

a working chain pointer module of the packet processing engine programmed to generate a next packet memory address; and a return address register of the working chain pointer module, adapted to store a return packet address, wherein, upon processing a call packet, the packet processor engine instructs the working chain pointer module to generate the next packet memory address pointing to the packet routine, and wherein upon processing a return packet, the packet processor engine signals the working chain pointer module to generate the return packet address to resume a normal packet flow.

11. The system according to claim 10, wherein in response to processing the call packet, the packet processor engine sends to the working chain pointer module a "load subroutine address signal" containing a subroutine address obtained from the call packet, and a "save return address signal".

12. The system according to claim 11, wherein upon receiving the "save return address signal", the working chain pointer module stores a packet address immediately following the current packet address in the return address register.

13. The system according to claim 10, wherein in response to processing the return packet, the packet processor engine sends to the working chain pointer a "load return address" signal.

14. The system according to claim 10, wherein the working chain pointer module generates the next packet memory address based on a packet address immediately following the current packet address in response to a "get packet" signal from the packet processor engine.

15. The system according to claim 10, wherein the working chain pointer module generates the next packet memory address based on a subroutine packet address from the call packet in response to a "load subroutine address" signal from the packet processor engine.

16. The system according to claim 10, wherein the working chain pointer module generates the next packet memory address based on a packet address retrieved from the return address register in response to a "load return address" signal from the packet processor engine.

17. A method of loading a packet routine during a normal packet flow, comprising placing a call packet in the normal packet flow;

placing a return packet concluding the packet routine;

in a packet processor engine, executing a next packet associated with the packet routine upon processing the call packet;

storing a packet address immediately following a current packet address of the normal packet flow before executing the packet routine; and in the packet processor engine, executing a next packet returning to the normal packet flow upon processing the return packet.

18. An electronic processor having a protocol controller that supports calls to a packet routine, the protocol controller being adapted to execute stored instructions that include instructions to process a next packet from a packet memory associated with the packet routine upon receiving a call packet embedded in a normal flow of packets;

storing a packet address immediately following a current packet address of the normal flow of packets before executing the packet routine; and processing a next packet returning to the normal flow of packets upon receiving a return packet terminating the packet routine.

19. The electronic processor according to claim 18, wherein the instructions comprise retrieving a packet memory address of the packet routine from the call packet.

20. The electronic processor according to claim 18, wherein the instructions comprise retrieving a packet from the packet memory having an address corresponding to the packet address immediately following the current packet address during the normal flow of packets.

* * * * *